(12) United States Patent
Lee et al.

(10) Patent No.: US 10,855,114 B2
(45) Date of Patent: Dec. 1, 2020

(54) WIRELESS POWER TRANSMISSION SYSTEM USING PATCH ANTENNA

(71) Applicant: UNIVERSITY-INDUSTRY COOPERATION GROUP OF KYUNG HEE UNIVERSITY, Yongin-si (KR)

(72) Inventors: Bom Son Lee, Yongin-si (KR); Sang Woong Yoon, Seongnam-si (KR); Ju Hwan Lim, Anyang-si (KR); Gun Young Kim, Andong-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/226,825

(22) Filed: Dec. 20, 2018

(65) Prior Publication Data

US 2019/0199138 A1    Jun. 27, 2019

(30) Foreign Application Priority Data

Dec. 21, 2017   (KR) .................. 10-2017-0177335

(51) Int. Cl.
*H02J 50/23*    (2016.01)
*H02J 7/02*     (2016.01)
(Continued)

(52) U.S. Cl.
CPC .......... *H02J 50/23* (2016.02); *H01Q 9/0407* (2013.01); *H02J 7/025* (2013.01); *H02J 50/12* (2016.02);
(Continued)

(58) Field of Classification Search
CPC ........ H01Q 9/0407; H02J 50/12; H02J 50/23; H02J 50/27; H02J 50/40; H02J 7/025; H04B 5/0037
(Continued)

(56) References Cited

U.S. PATENT DOCUMENTS 5,448,252 A * 9/1995 Ali ........................... H01Q 1/40
                                                    333/237
6,091,364 A * 7/2000 Murakami ............. H01Q 1/084
                                                    343/700 MS
(Continued)

FOREIGN PATENT DOCUMENTS

KR  10-2003-0025475 A  3/2003
KR  10-2005-0043520 A  5/2005
(Continued)

OTHER PUBLICATIONS

Communication dated Oct. 11, 2018 issued by the Korean Patent Office in counterpart Korean Patent Application No. 10-2017-0177335.

*Primary Examiner* — Rexford N Barnie
*Assistant Examiner* — Brian K Baxter
(74) *Attorney, Agent, or Firm* — Sughrue Mion, PLLC

(57) ABSTRACT

Disclosed is a wireless power transmission system including a microstrip patch antenna. More particularly, a microstrip patch antenna according to an embodiment of the present disclosure includes a substrate, a patch disposed on the substrate, and a plurality of protrusions with a conical shape disposed on the patch.

9 Claims, 13 Drawing Sheets

(51) Int. Cl.
    *H01Q 9/04*    (2006.01)
    *H02J 50/27*   (2016.01)
    *H04B 5/00*    (2006.01)
    *H02J 50/12*   (2016.01)
    *H02J 50/40*   (2016.01)

(52) U.S. Cl.
    CPC .............. *H02J 50/27* (2016.02); *H02J 50/40* (2016.02); *H04B 5/0037* (2013.01)

(58) Field of Classification Search
    USPC ........................................................ 307/104
    See application file for complete search history.

(56) References Cited

U.S. PATENT DOCUMENTS

| | | | | |
|---|---|---|---|---|
| 6,563,398 B1* | 5/2003 | Wu | .................... | H01Q 21/0037 333/137 |
| 7,015,868 B2* | 3/2006 | Puente Baliarde | ...... | H01Q 1/36 343/800 |
| 10,396,859 B1* | 8/2019 | Hong | .................... | H04B 17/318 |
| 2017/0133756 A1* | 5/2017 | Eastburg | .............. | H01Q 21/061 |
| 2019/0044389 A1* | 2/2019 | Lee | .......................... | H02J 50/20 |
| 2019/0165608 A1* | 5/2019 | Hong | ..................... | H02J 50/40 |
| 2019/0199146 A1* | 6/2019 | Kim | ......................... | H02J 50/40 |

FOREIGN PATENT DOCUMENTS

| | | |
|---|---|---|
| KR | 10-2015-0045985 A | 4/2015 |
| KR | 10-1739889 B1 | 5/2017 |

\* cited by examiner

【FIG. 1】
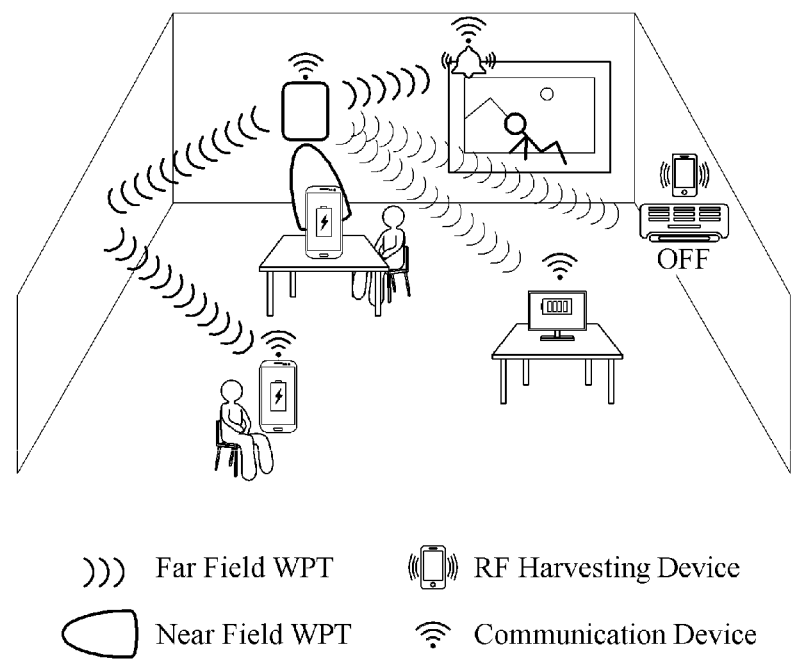
))) Far Field WPT  
⬒ Near Field WPT  
(((📱))) RF Harvesting Device  
📶 Communication Device
【FIG. 2】
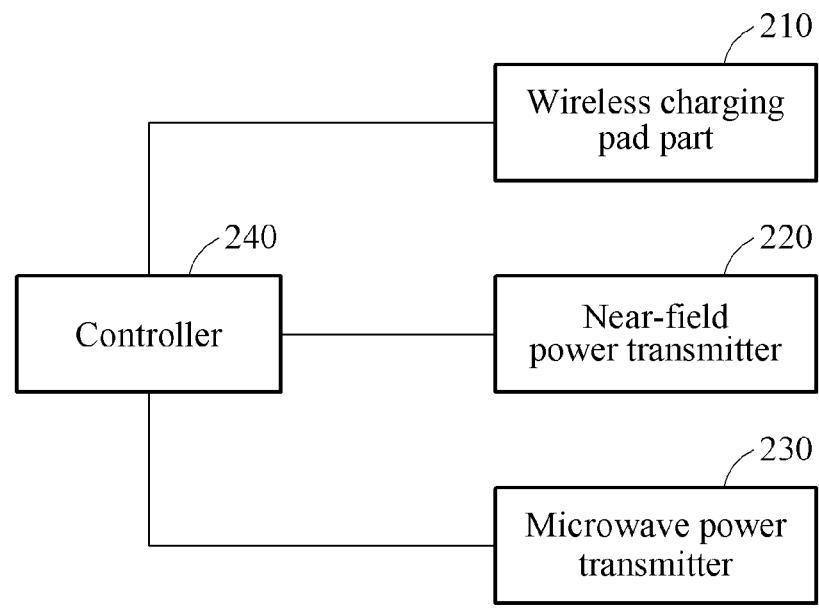

【FIG. 3】
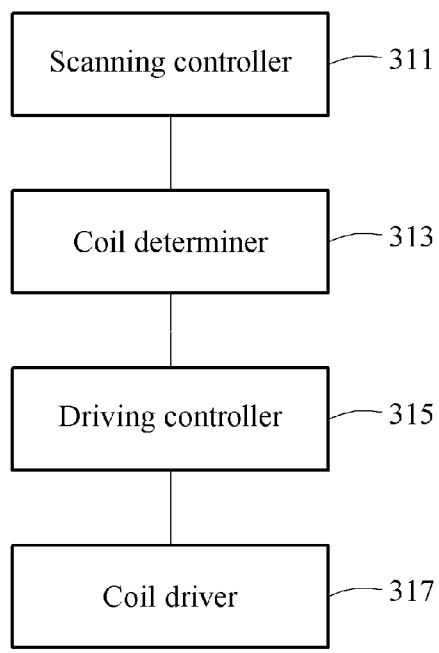
【FIG. 4】
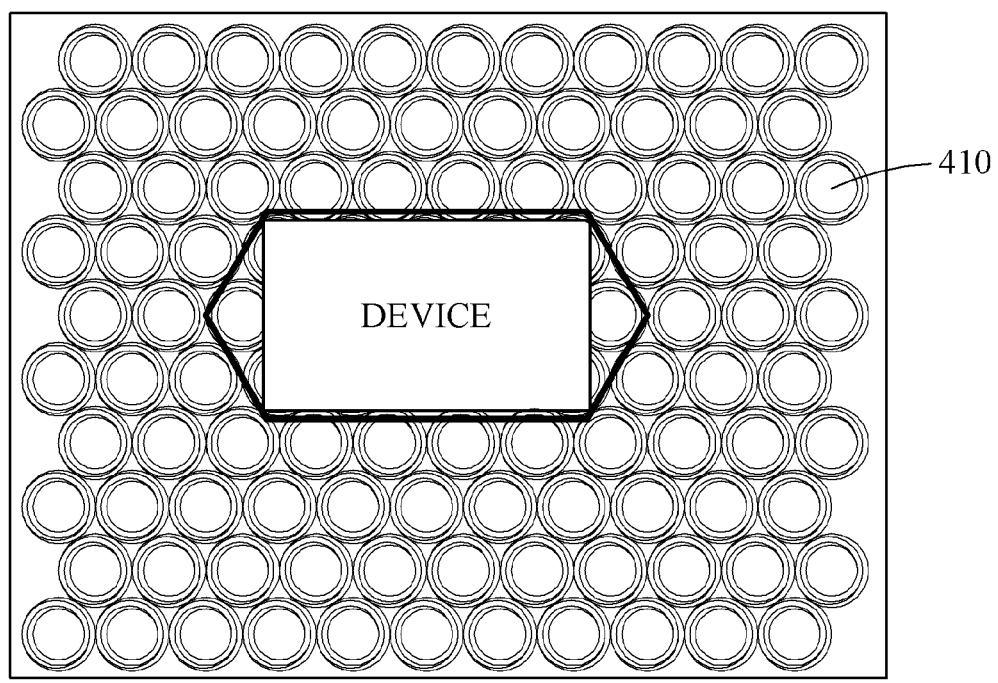

[FIG. 5]
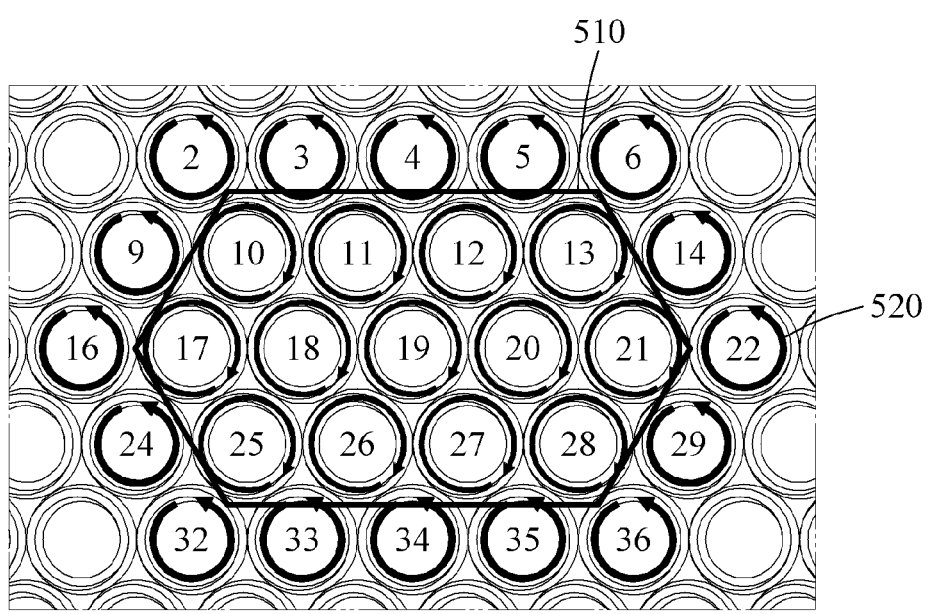

[FIG. 6]
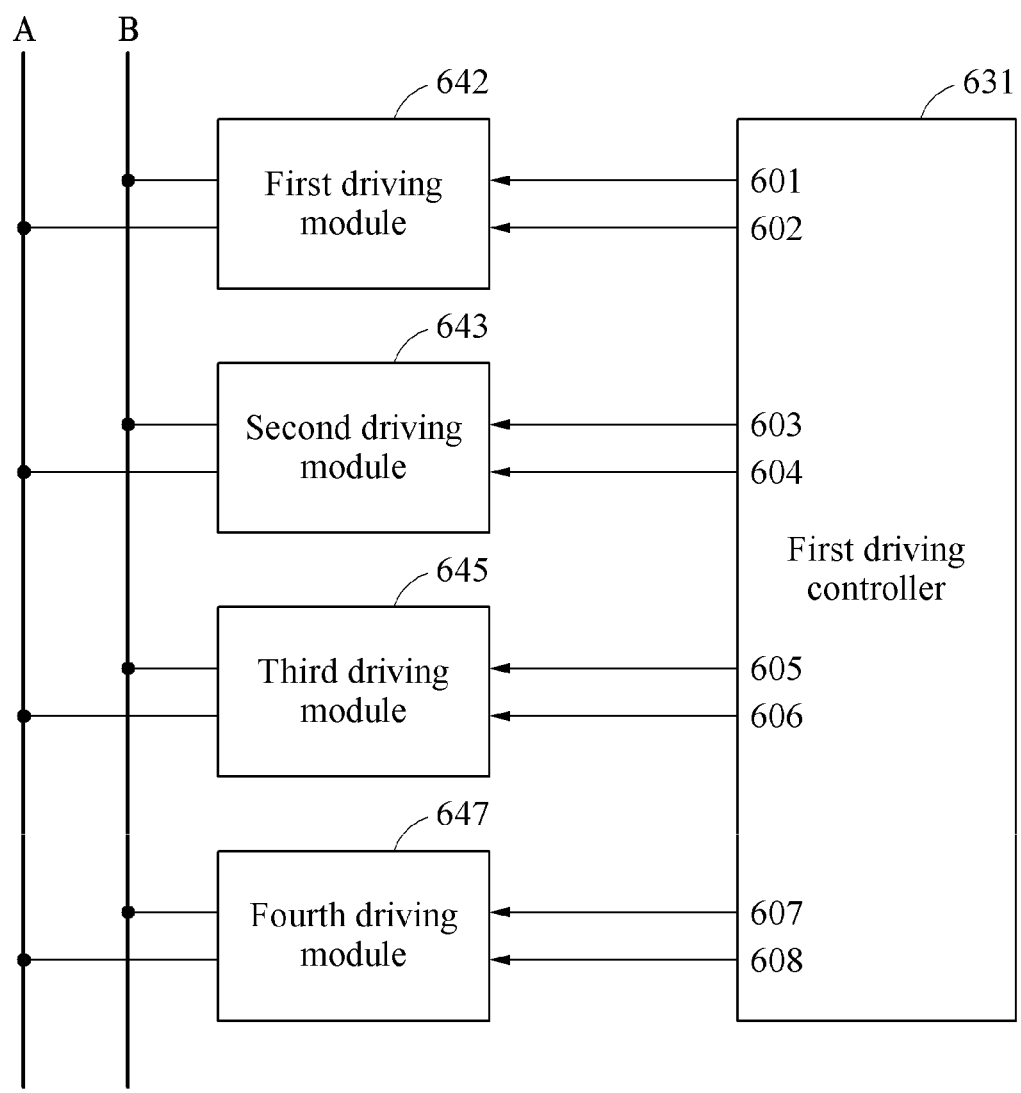

【FIG. 7】
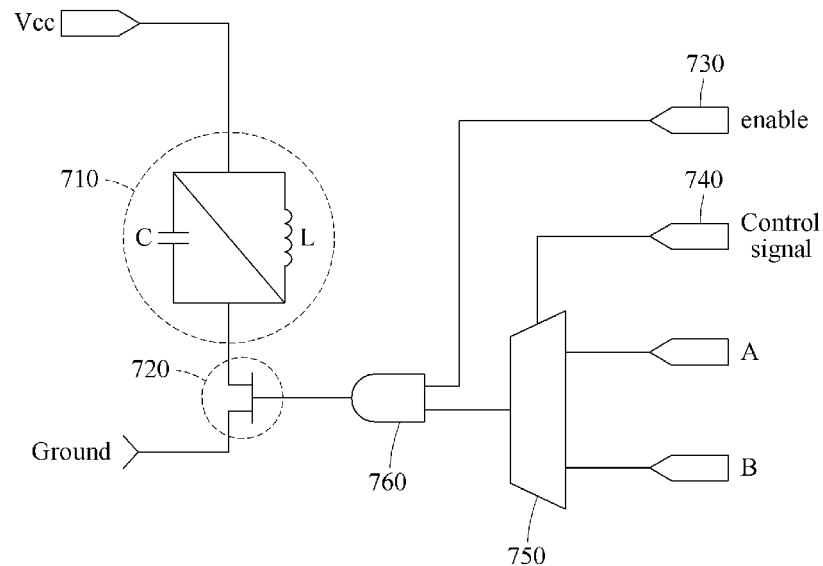
【FIG. 8】
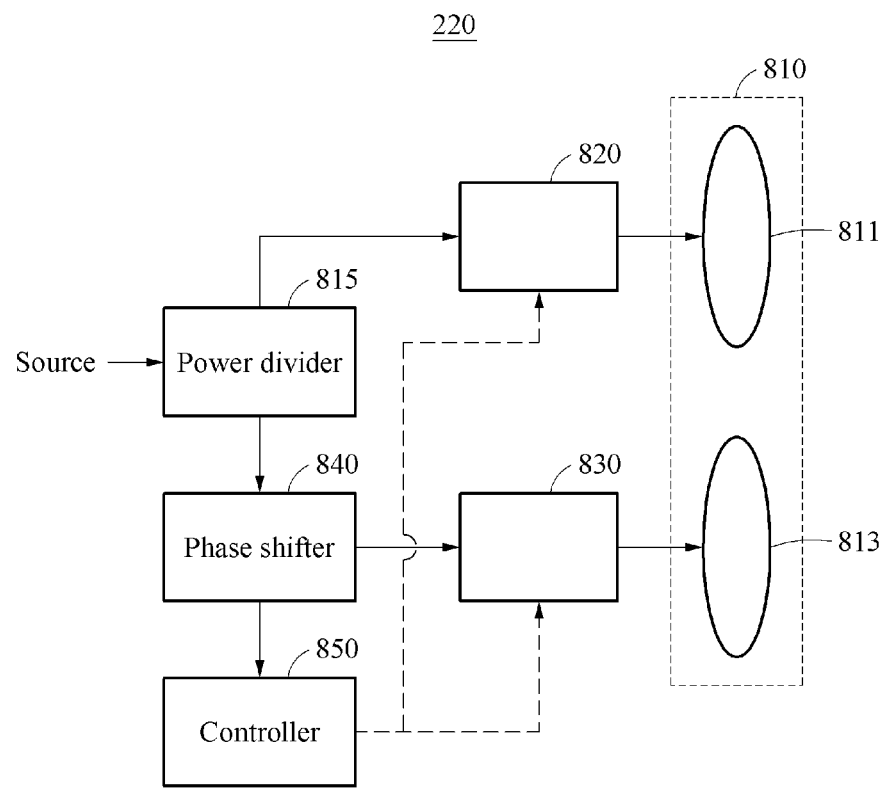

[FIG. 9]
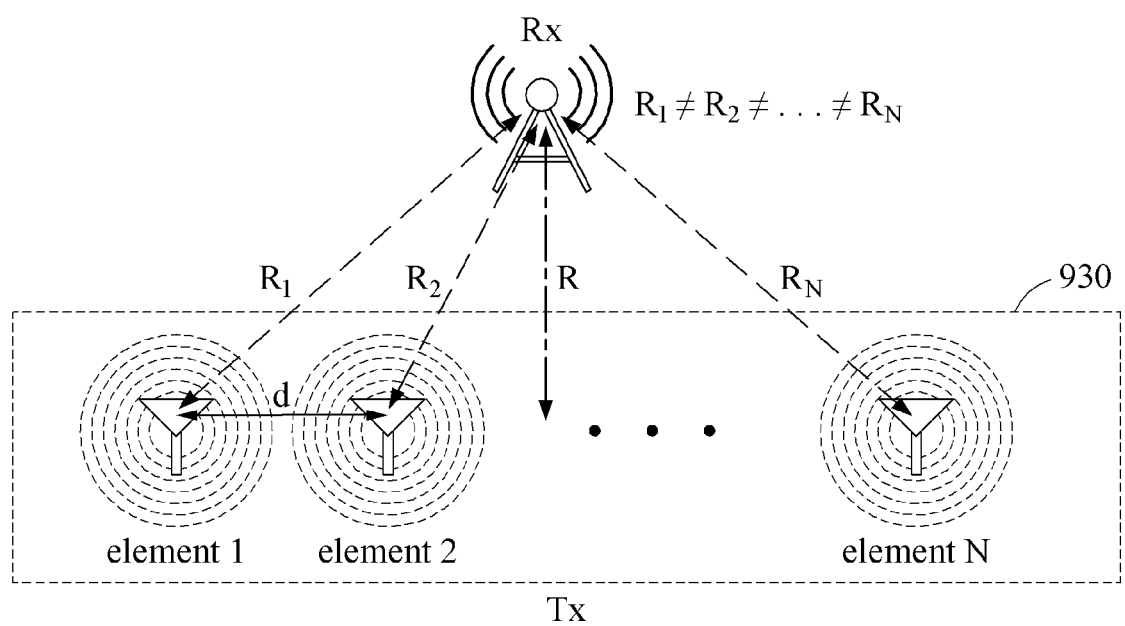
[FIG. 10]
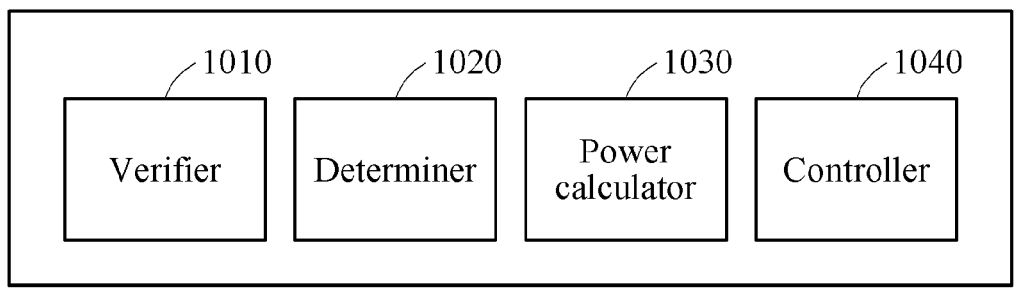

[FIG. 11]
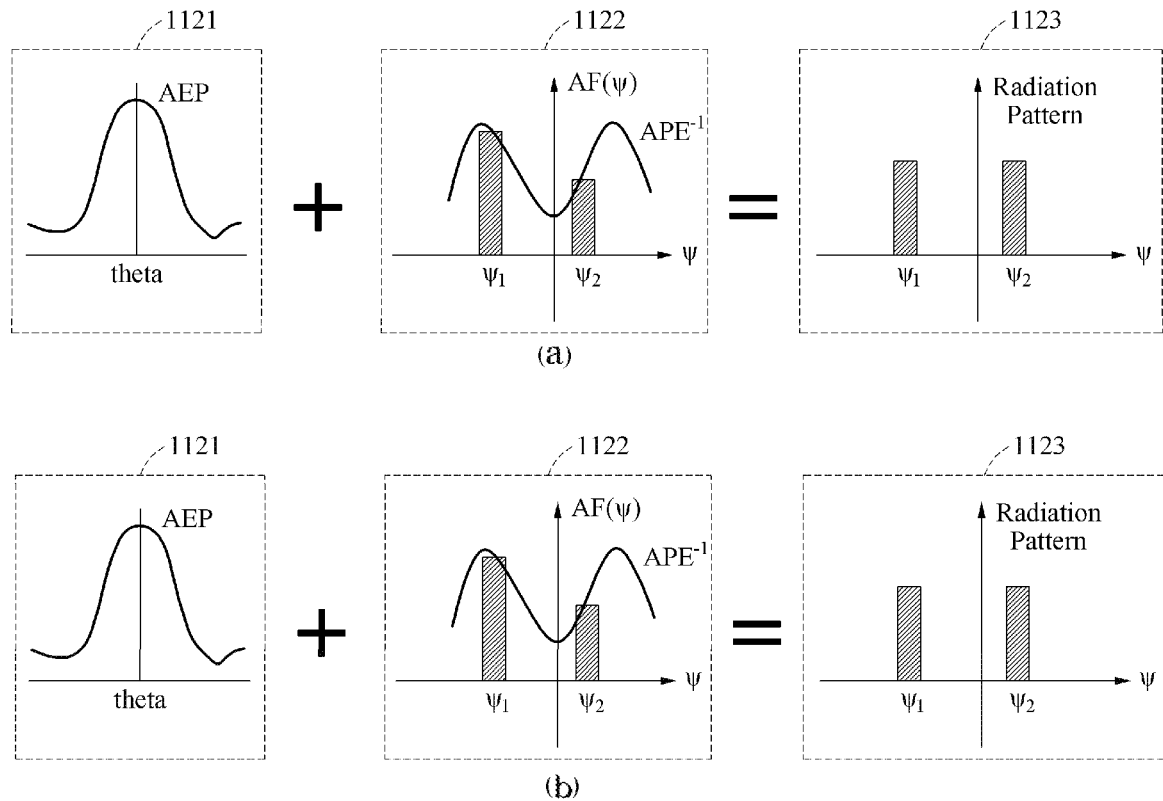
[FIG. 12A]
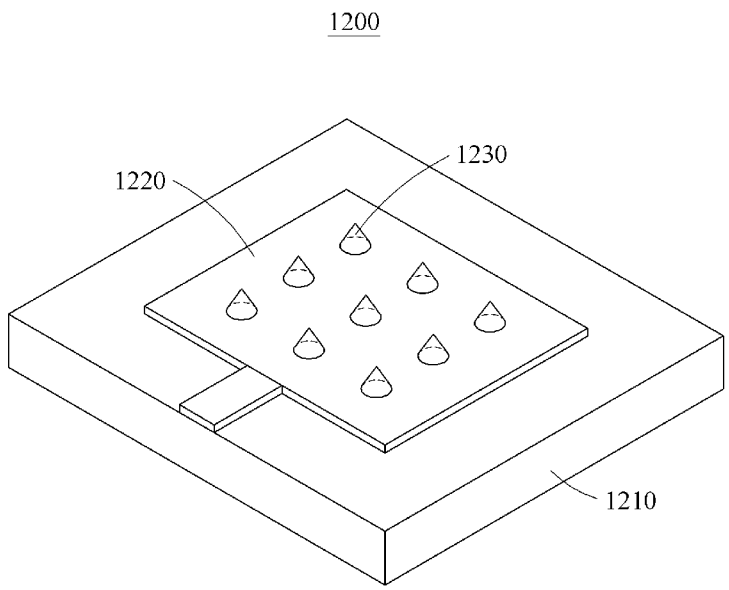

【FIG. 12B】
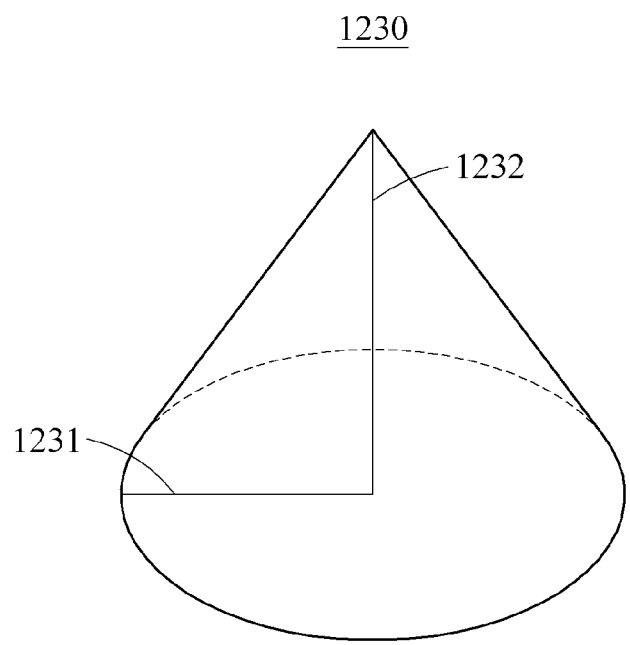
【FIG. 13A】
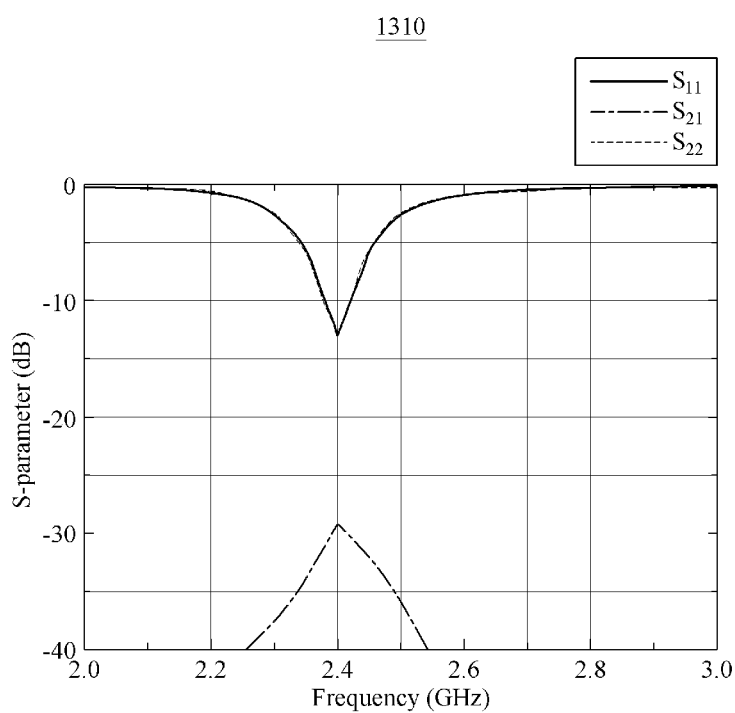

【FIG. 13B】
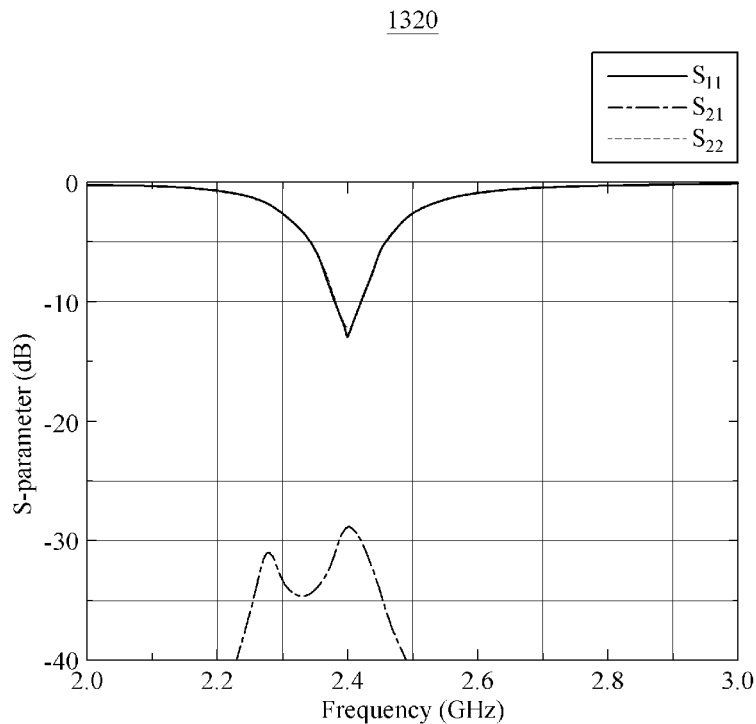
【FIG. 13C】
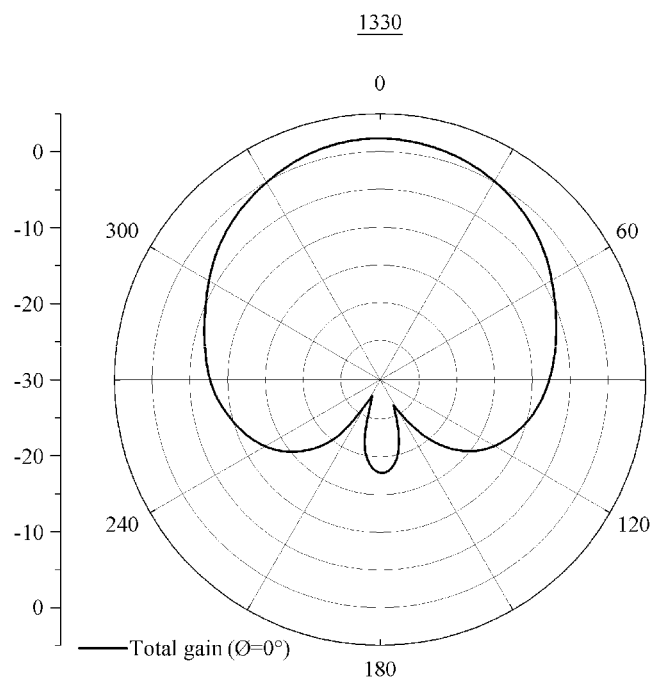

【FIG. 13D】
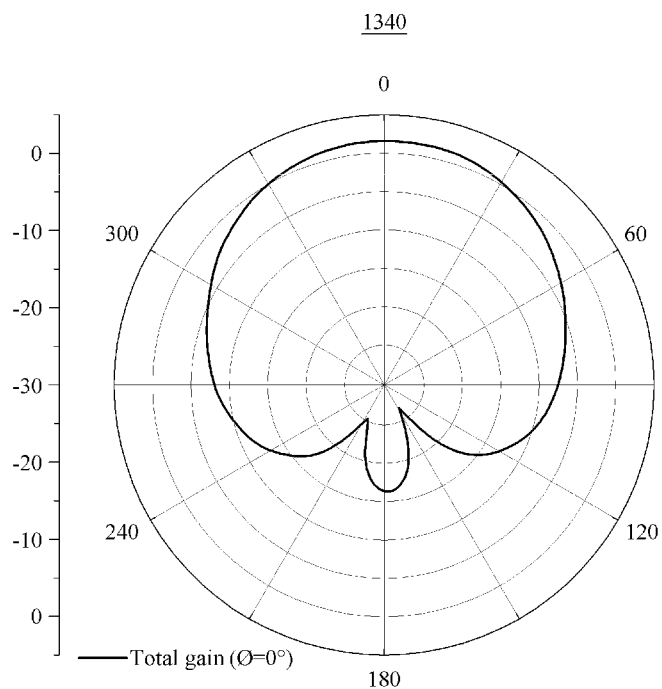
【FIG. 14A】
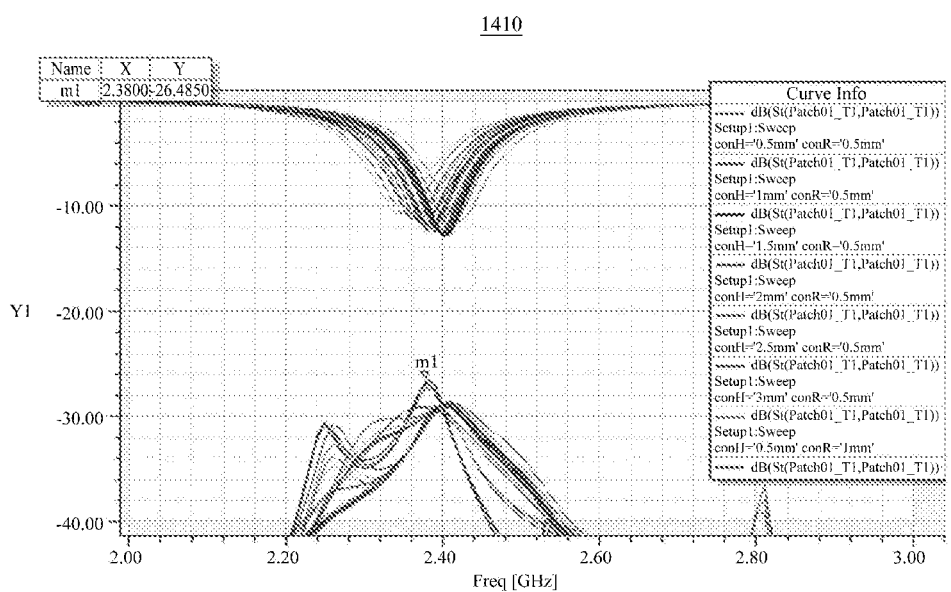

[FIG. 14B]
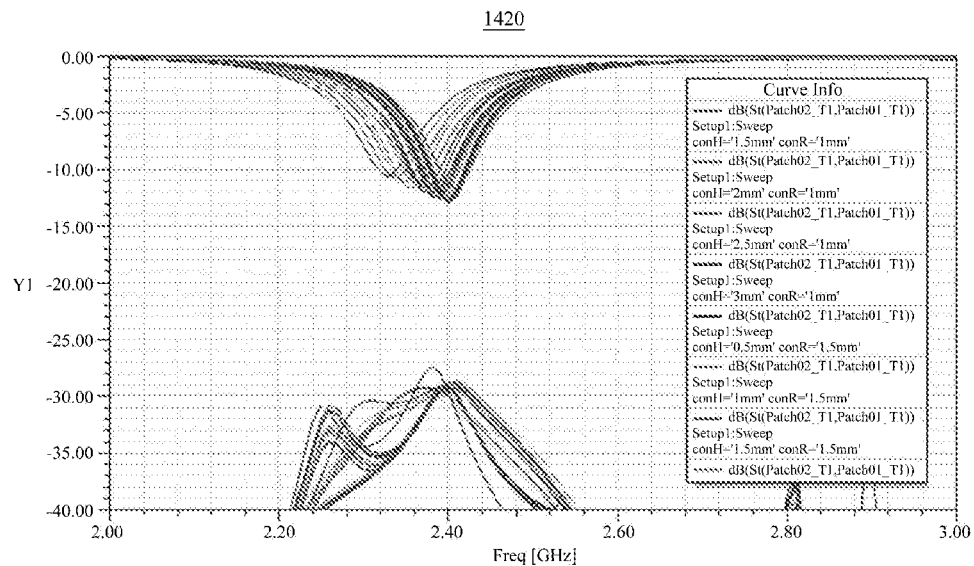
[FIG. 15A]
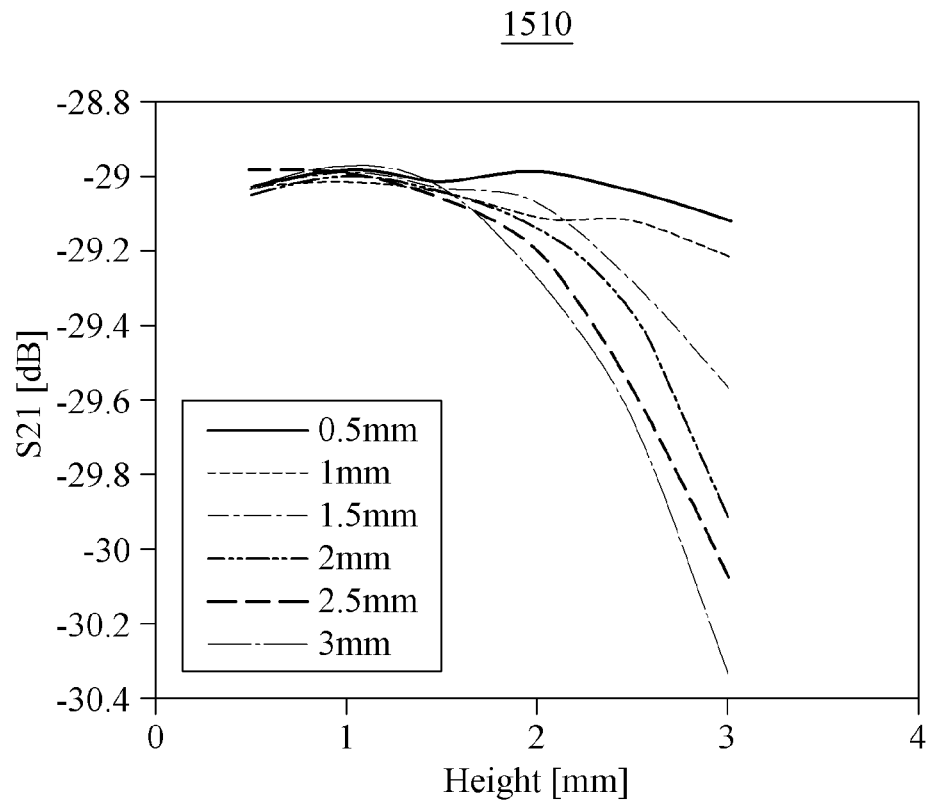

【FIG. 15B】
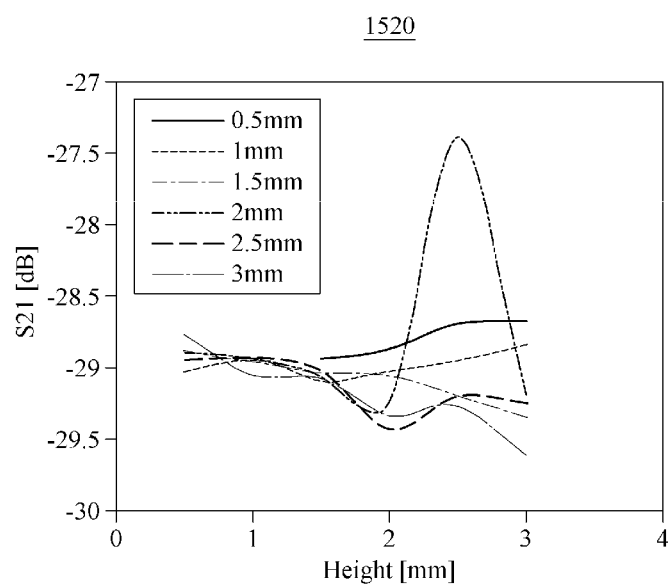

【FIG. 15C】
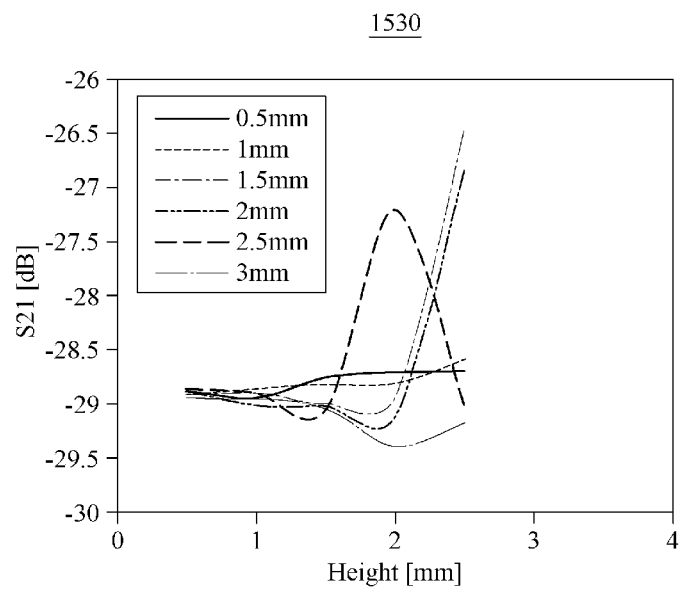
【FIG. 15D】
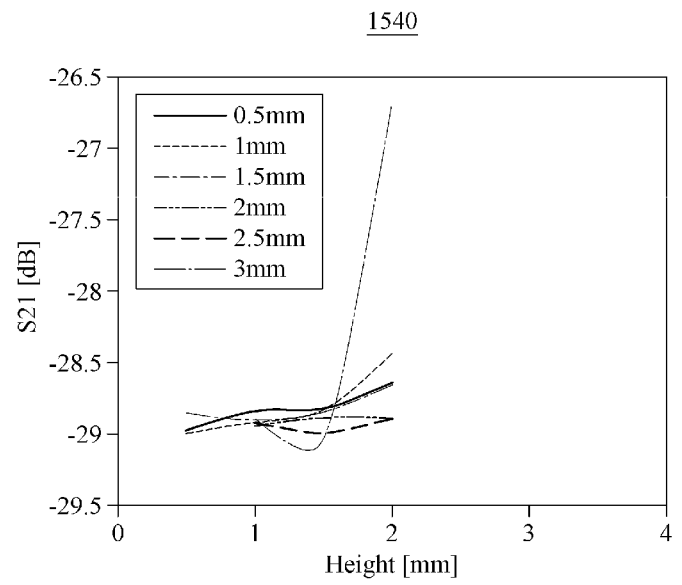

WIRELESS POWER TRANSMISSION SYSTEM USING PATCH ANTENNA

CROSS-REFERENCE TO RELATED APPLICATION

This application claims priority to Korean Patent Application No. 10-2017-0177335, filed on Dec. 21, 2017 in the Korean Intellectual Property Office, the disclosure of which is incorporated herein by reference.

BACKGROUND OF THE DISCLOSURE

Field of the Disclosure

The present disclosure relates to wireless power transmission, and more particularly, to a wireless power transmission system using a patch antenna.

Description of the Related Art

Wireless power transmission systems include a wireless power transmission device for wirelessly transmitting electrical energy and a wireless power reception device for receiving electrical energy from the wireless power transmission device.

By using a wireless power transmission system, a battery of a mobile phone can be charged, for example, merely by placing the mobile phone on a charging pad without connecting the mobile phone to a separate charging connector.

A method of wirelessly transmitting electrical energy can be classified into a magnetic induction method, a magnetic resonance method, and an electromagnetic wave method according to the principle of transferring electrical energy.

A magnetic induction method is a method of transmitting electrical energy using a phenomenon wherein electricity is induced between a transmitter coil and a receiver coil.

A magnetic resonance method is a method of generating a magnetic field oscillating at a resonance frequency in a transmitter coil and intensively transmitting energy to a receiver coil designed to operate at the same resonance frequency.

An electromagnetic wave or microwave method is a method wherein an electromagnetic wave generated in a transmitter is received by a receiver using one or several antennas and the received electromagnetic wave is converted into electrical energy.

Meanwhile, wireless power transmission can be classified into flexibly coupled wireless power transfer technology (hereinafter referred to as "flexibly coupled technology") and tightly coupled wireless power transfer technology (hereinafter referred to as "tightly coupled technology") according to the magnetic resonant coupling form or strength of a transmitter coil and a receiver coil.

Here, in the case of the "flexibly coupled technology," magnetic resonant coupling may be formed between one transmitter resonator and a plurality of receiver resonators, whereby multiple concurrent charging is possible.

Here, the "tightly coupled technology" merely enables power transmission between one transmitter coil and one receiver coil (one-to-one power transmission).

Wireless power transmission systems can be applied to complex wireless channel environments such as homes, offices, airports, and trains.

In addition, wireless power transmission systems can be applied to an environment in which a wireless device/IoT device/wearable device is charged by synthesizing a three-dimensional beam pattern of an array antenna based on beacon positioning technology, etc. in a three-dimensional space.

RELATED ART DOCUMENTS

Patent Documents

Korean Patent No. 10-1739889 entitled "HIGH EFFICIENT PLANAR ARRAY ANTENNA WITH PROTRUSION DIELECTRIC LOADING STRUCTURE FOR TILTED BEAM DIRECTION"

SUMMARY OF THE DISCLOSURE

Therefore, the present disclosure has been made in view of the above problems, and it is one object of the present disclosure to provide a wireless power transmission system capable of being applied to complex wireless channel environments such as a home, an office, an airport, a train, etc.

In accordance with another aspect of the present disclosure, there is provided a wireless power transmission system including a patch antenna to which conical protrusions are applied, thus improving antenna gain and transmission efficiency.

In accordance with an aspect of the present disclosure, the above and other objects can be accomplished by the provision of a microstrip patch antenna including a substrate; a patch disposed on the substrate; and a plurality of protrusions with a conical shape disposed on the patch.

In accordance with an aspect, the microstrip patch antenna may be applied to at least one of a wireless power transmission antenna and a wireless power reception antenna.

In accordance with an aspect, an inside of each of the protrusions may be filled with a conductor or a dielectric.

In accordance with an aspect, an inside of each of the protrusions may be evacuated into a vacuum state.

In accordance with an aspect, at least one of the number of the protrusions and a radius and height of each of the protrusions may be determined such that reception power is maximized.

In accordance with an aspect, when it is determined that the number of the protrusions is 4 and a height of each of the protrusions is 1.5 mm to 3 mm, a radius of each of the protrusions may be set to 0.5 mm to 1.5 mm.

In accordance with an aspect, when it is determined that the number of the protrusions is 9 and a height of each of the protrusions is 2 mm to 3 mm, a radius of each of the protrusions may be set to 0.5 mm to 2 mm.

In accordance with an aspect, when it is determined that the number of the protrusions is 16 and a height of each of the protrusions is 2 mm to 3 mm, a radius of each of the protrusions is set to 1.5 mm to 2.5 mm.

In accordance with an aspect, when it is determined that the number of the protrusions is 16 and a height of each of the protrusions is 1.5 mm to 2 mm, a radius of each of the protrusions may be set to 2.5 mm.

In accordance with an aspect, when it is determined that the number of the protrusions is 25 and a height of each of the protrusions is 1.5 mm to 2 mm, a radius of each of the protrusions may be set to 2.5 mm.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is an exemplary diagram illustrating an environment where a wireless power transmission system is applied;

FIG. 2 is a view illustrating a wireless power transmission device capable of transmitting power in various manners in an environment as illustrated in FIG. 1;

FIG. 3 is a view illustrating a configuration example of the wireless charging pad part of FIG. 2;

FIG. 4 is a view illustrating a configuration example of a wireless charging pad of a wireless charging pad part according to an embodiment of the present disclosure;

FIG. 5 is a view illustrating an operation example of the wireless charging pad illustrated in FIG. 4, on which a device to be charged is placed;

FIG. 6 is a view illustrating a configuration example of the driving controller and coil driver illustrated in FIG. 3;

FIG. 7 is a view illustrating a configuration example of a coil driver and a connection between small power transmission coils and the coil driver, according to an embodiment of the present disclosure;

FIG. 8 is a view illustrating another configuration example of the near-field power transmitter of FIG. 2;

FIG. 9 is a view illustrating the configuration and operation environment of the microwave power transmitter of FIG. 2;

FIG. 10 is a view illustrating another configuration example of the microwave power transmitter of FIG. 2;

FIG. 11 is a view illustrating a beam formation manner of the microwave power transmitter illustrated in FIG. 10;

FIG. 12A is a view illustrating a microstrip patch antenna according to an embodiment of the present disclosure;

FIG. 12B is a view illustrating a protrusion provided on a microstrip patch antenna according to an embodiment of the present disclosure;

FIG. 13A is a view illustrating reception power when a conventional microstrip patch antenna is applied;

FIG. 13B is a view illustrating reception power when a microstrip patch antenna according to an embodiment of the present disclosure is applied;

FIG. 13C is a view illustrating a radiation pattern of a conventional microstrip patch antenna;

FIG. 13D is a view illustrating a radiation pattern of a microstrip patch antenna according to an embodiment of the present disclosure;

FIGS. 14A and 14B illustrate antenna characteristic changes dependent upon changes in a radius and height of each protrusion of a microstrip patch antenna according to an embodiment of the present disclosure; and FIGS. 15A to 15D illustrate maximum reception power ratio changes dependent upon changes in a radius and height of each protrusion included in a microstrip patch antenna according to an embodiment of the present disclosure.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular forms "a", "an" and "the" are intended to include the plural forms as well, unless context clearly indicates otherwise.

In addition, the terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIG. 1 is an exemplary diagram illustrating an environment where a wireless power transmission system is applied.

As illustrated in FIG. 1, a wireless power transmission environment may be a three-dimensional space such as a living room or a room in a home, an office, an airport, or a train.

Power transmission in a three-dimensional space may be performed by near-field wireless power transmission adopting a magnetic induction method or a magnetic resonance method. In addition, an electromagnetic method capable of covering near and far distances depending upon the location and type of a power reception device may be used.

Meanwhile, a power reception device may be a communication device. The power reception device may be provided with an RF harvesting device capable of collecting energy from electromagnetic waves in a three-dimensional space.

FIG. 2 is a view illustrating a wireless power transmission device capable of transmitting power in various manners in an environment as illustrated in FIG. 1.

Referring to FIG. 1, the wireless power transmission device may include at least one of a wireless charging pad part 210, a near-field power transmitter 220, and a microwave power transmitter 230.

In other words, although all of the wireless charging pad part 210, the near-field power transmitter 220, and the microwave power transmitter 230 are illustrated in FIG. 2, a power transmission device using one power transmission manner may be merely provided depending upon a three-dimensional space environment.

Accordingly, in the following description, the wireless power transmission device or the power transmission device should be understood as including at least one of the wireless charging pad part 210, the near-field power transmitter 220, and the microwave power transmitter 230.

A controller 240 may control operation of at least one of the wireless charging pad part 210, the near-field power transmitter 220, and the microwave power transmitter 230.

The controller 240 may monitor a three-dimensional space environment and, based on the monitoring result, may control operation of at least one of the wireless charging pad part 210, the near-field power transmitter 220, and the microwave power transmitter 230.

For example, when long-distance transmission is unnecessary, the controller 240 may control the wireless charging pad part 210 and the near-field power transmitter 220 to operate and the microwave power transmitter 230 not to operate.

The wireless charging pad part 210 may transmit power by a magnetic induction method or a magnetic resonance method.

The near-field power transmitter 220 may transmit power to a three-dimensional space by a magnetic resonance method.

The microwave power transmitter 230 may transmit power to a three-dimensional space by a microwave power transmission method.

Meanwhile, "far field" may be defined as a case wherein a distance between a transmitting end and a receiving end is "2×(antenna length)$^2$/wavelength" or more.

FIG. 3 is a view illustrating a configuration example of the wireless charging pad part of FIG. 2.

The device illustrated in FIG. 3 may include a wireless charging pad (not shown) and a device for driving the wireless charging pad. Here, the wireless charging pad may be configured as illustrated in FIG. 4.

The wireless charging pad-driving device may include a driving controller 315 and a coil driver 317. The wireless charging pad-driving device may further include a coil determiner 313 and a scanning controller 311.

The wireless charging pad-driving device according to an embodiment of the present disclosure may include the driving controller 315 configured to each independently control driving of a plurality of small power transmission coils constituting the wireless charging pad; and a plurality of driving modules configured to respectively drive the small power transmission coils according to a first or second control signal input by the driving controller 315.

The scanning controller 311 scans the wireless charging pad so as to detect a device to be charged on the wireless charging pad constituted of the small power transmission coils.

The scanning controller 311 may detect, using at least one of an impedance change and a pressure change in each of the small power transmission coils, whether a device to be charged is placed on the small power transmission coils.

The coil determiner 313 verifies power transmission coils to be driven, located under the device to be charged, among the small power transmission coils, and verifies power transmission coils surrounding the power transmission coils to be driven among the small power transmission coils.

The driving controller 315 may generate a first control signal to apply a first driving voltage having a first phase to the power transmission coils to be driven, and may generate a second control signal to apply a second driving voltage having a phase different from the first phase to the surrounding power transmission coils.

Here, the power transmission coils to be driven may be small power transmission coils matching a device to be charged. The expression "matching a device to be charged" may refer to a state wherein small power transmission coils are placed under or near a device to be charged to transmit power to the device to be charged.

Here, the first control signal may be a "Select" signal controlling the coil driver 317 to select an "A" signal from the "A" signal and a "B" signal, which has a phase opposite to the "A" signal, illustrated in FIGS. 6 and 7.

In addition, the second control signal may be a "Select" signal controlling the coil driver 317 to select a "B" signal from the "A" signal and the "B" signal, which has a phase opposite to the "A" signal, illustrated in FIGS. 6 and 7.

The coil driver 317 applies the first and second driving signals to the wireless charging pad.

FIG. 4 is a view illustrating a configuration example of a wireless charging pad of a wireless charging pad part according to an embodiment of the present disclosure.

Referring to FIG. 4, a plurality of small power transmission coils 410 may be disposed in a tessellated structure, without overlapping each other, on the wireless charging pad.

In addition, FIG. 5 illustrates "DEVICE," as an example of a device to be charged, placed on the wireless charging pad.

Here, it is possible to control to only operate small power transmission coils inside a hexagonal bold line inside which "DEVICE" is located, among a total of small power transmission coils.

FIG. 5 is a view illustrating an operation example of the wireless charging pad illustrated in FIG. 4, on which a device to be charged is placed.

Referring to FIGS. 3 and 5, the scanning controller 311 may detect whether a device to be charged is placed on corresponding small power transmission coils, using at least one of an impedance change and a pressure change in each of the small power transmission coils.

For example, upon scanning using an impedance change, a device to be charged may be determined that it has been placed on corresponding coils when an impedance change in the coils is outside a preset range.

In addition, when the small power transmission coils are respectively provided with pressure sensors, the pressure sensors may detect whether a device to be charged is placed on the pressure sensors, through pressure change.

The scanning controller 311 may detect whether a device to be charged is placed on coils 10, 11, 12, 13, 17, 18, 19, 20, 21, 25, 26, 27, and 28 by scanning the wireless charging pad.

When coils under a position at which a device to be charged is placed are detected as coils 10, 11, 12, 13, 17, 18, 19, 20, 21, 25, 26, 27, and 28, as a result of scanning by the scanning controller 311, the coil determiner 520 may verify that each of the coils 10, 11, 12, 13, 17, 18, 19, 20, 21, 25, 26, 27, and 28 is a power transmission coil to be driven.

In addition, the coil determiner 313 may verify coils 2, 3, 4, 5, 6, 9, 14, 16, 22, 24, 29, 32, 33, 34, 35, and 36, among the small power transmission coils, as coils surrounding the power transmission coils to be driven 10, 11, 12, 13, 17, 18, 19, 20, 21, 25, 26, 27, and 28.

In the embodiment illustrated in FIG. 5, clockwise arrows indicate a first phase, and counterclockwise arrows indicate a second phase.

The coil driver 317 may output the first driving signal to corresponding small power transmission coils upon receiving input of a first control signal, and may output the second driving signal to corresponding small power transmission coils upon receiving input of a second control signal.

For example, the coil driver 317 may output the first driving signal to each of power transmission coils to be driven 10, 11, 12, 13, 17, 18, 19, 20, 21, 25, 26, 27, and 28, and may output the second driving signal to each of surrounding power transmission coils 2, 3, 4, 5, 6, 9, 14, 16, 22, 24, 29, 32, 33, 34, 35, and 36.

By operating coils under a position, at which a device to be charged is located, in this manner, power may be transmitted to the device to be charged. In addition, by operating coils near the coils, which are under a position at which the device to be charged is located, to have an opposite phase, magnetic force lines toward the device to be charged may increase, but magnetic force lines spreading to the outside may be reduced.

Accordingly, even when power transmitted to the device to be charged is increased, power transmission efficiency may be maintained and influence of magnetic field lines on the outside may be reduced.

FIG. 6 is a view illustrating a configuration example of the driving controller and coil driver illustrated in FIG. 3.

FIG. 6 illustrates an embodiment wherein one driving controller (a first driving controller, 631) controls four driving modules 642, 643, 645, and 647.

Although not illustrated in FIG. 9, a plurality of driving controllers, such as second and third driving controllers, other than the first driving controller 631 may be provided.

Here, the first driving controller 631 may be a shift register having eight output signal terminals 601 to 608.

Accordingly, when first driving controllers 631, as shift registers, are connected in a cascade form, circuits for individually driving small power transmission coils may be linearly extended.

The driving modules 642, 643, 645, and 647 may be respectively connected to the small power transmission coils.

For example, the first driving module 642 may be connected to a first small power transmission coil, the second driving module 643 may be connected to a second small power transmission coil, the third driving module 645 may be connected to a third small power transmission coil, and the fourth driving module 647 may be connected to a fourth small power transmission coil.

Accordingly, when the wireless charging pad is provided with 36 small power transmission coils, the wireless charging pad may include 36 driving modules and 9 driving controllers.

Accordingly, a driving device for the wireless charging pad according to an embodiment of the present disclosure may include a first driving controller configured to each independently control driving of small power transmission coils constituting a first wireless charging module; and a second driving controller configured to each independently control driving of a plurality of small power transmission coils constituting a second wireless charging module.

Here, an end of the second driving controller may be connected to the first driving controller, and another end of the second driving controller may be connected to a third driving controller, thereby supporting expansion of the wireless charging modules.

Referring to FIG. 9 again, the coil driver includes the driving modules 642, 643, 645, and 647 respectively connected to the small power transmission coils.

In addition, the coil driver may include two bus lines that respectively apply a first switching signal A having the first phase and a second switching signal B having the second phase to the driving modules 642, 643, 645, and 647.

The first driving controller 631 applies an enable signal and a first or second control signal, which control a corresponding driving module to operate, to each of the driving modules.

The first driving controller 631 may apply an enable signal to driving modules respectively connected to the power transmission coils to be driven and the surrounding power transmission coils, and may apply the first or second control signal to the driving modules to which the enable signal is applied.

For example, when the first driving module 642 is a driving module connected to a power transmission coil to be driven, the enable signal may be output to a terminal 601, and the first control signal may be output to a terminal 602.

For example, when the fourth driving module 647 is a driving module connected to a surrounding power transmission coil, the enable signal may be output to a terminal 607, and the second control signal may be output to a terminal 608.

FIG. 7 is a view illustrating a configuration example of a coil driver and a connection between small power transmission coils and the coil driver, according to an embodiment of the present disclosure.

Referring to FIG. 7, reference numeral 710 denotes an equivalent circuit of one small power transmission coil.

One end of the small power transmission coil 710 may be connected to a driving voltage Vcc, and another end thereof may be connected to a switching element 720 provided in the coil driver.

Here, the coil driver may include the switching element 720 connected to the small power transmission coil 710; a multiplexer 750; and an AND gate element 760.

The coil driver may receive input of an enable signal through a terminal 730 and may receive input of a control signal through a terminal 740.

Here, the multiplexer 750 may output the first switching signal A when a control signal, which is input through the terminal 740, is a first control signal, and may output the second switching signal B when a control signal, which is input through the terminal 740, is a second control signal.

The AND gate element 760 may receive input of the enable signal, which is input through the terminal 730, and an output signal of the multiplexer 750 to control the switching element 720.

For example, when the small power transmission coil 710 is a power transmission coil to be driven, the first control signal may be input to the terminal 740, and the switching element 720 may be turned on/off by a switching signal such as signal A shown in FIG. 11.

The driving voltage Vcc is applied to the small power transmission coil 710 according to on/off of the switching element 720, so that the small power transmission coil 710 operates as a first driving voltage having a first phase.

For example, when the switching element 720 is an NMOS transistor, a capacitor of the small power transmission coil 710 is charged in a time period in which the NMOS transistor is turned on, and is discharged in a time period in which the NMOS transistor is turned off. The magnetic field of an inductor may be controlled through repetition of such charge and discharge.

FIG. 8 is a view illustrating another configuration example of the near-field power transmitter of FIG. 2.

Referring to FIG. 8, the near-field power transmitter may include a coil part 810 including a plurality of power transmission coils; a power divider 815; a first amplifier 820; a second amplifier 830; a phase shifter 840; and a controller 850.

The coil part 810 transmits wireless power to a reception coil using a magnetic resonance method.

For example, the coil part 810 may include two magnetic resonance coils 811 and 813.

The first and second magnetic resonance coils 811 and 813 may respectively form magnetic coupling with a single reception coil, thereby wirelessly transmitting power.

Such an environment constituted of a plurality of transmission coils and a single reception coil may be referred to as a Multiple Input Single Output (MISO) system.

Meanwhile, an environment constituted of a single transmission coil or a single transmitter and a single reception apparatus may be referred to as a Single Input Single Output (SISO) system.

The MISO system may more efficiently transmit power and exhibit superior performance even in an environment in which a power reception apparatus moves, compared to the SISO system.

However, also in the MISO system, magnetic coupling may be greatly affected according to an arranged state of transmission coils and a reception coil.

When phases of currents supplied to the first magnetic resonance coil 811 and the second magnetic resonance coil 813 are differently controlled, magnetic coupling may be formed without being greatly affected by an arrangement state of the transmission coils and the reception coil.

The power divider 815 may divide power supplied from a power source and may output the divided power to the first amplifier 820 and the phase shifter 840.

The phase shifter 840 may change a phase of input power.

The phase shifter 840 may adjust a phase of a current supplied to the second amplifier 830 by adjusting the phase of the input current.

Accordingly, phases of currents supplied to the first magnetic resonance coil 811 and the second magnetic resonance coil 813 may be differently adjusted.

For example, a difference between phases of currents supplied to the first magnetic resonance coil 811 and the second magnetic resonance coil 813 may be set to 0 to 180 degrees.

Through such phase control, an efficiency decrease problem caused by movement of a receiver in the MISO system may be addressed.

FIG. 9 is a view illustrating the configuration and operation environment of the microwave power transmitter of FIG. 2.

Referring to FIG. 9, the microwave power transmitter may include an array antenna part 930 including a plurality of antenna elements (element 1, element 2, ... element N).

The array antenna part 930 may adjust radiation characteristics by controlling a phase and the magnitude of distribution current of each of the antenna elements.

Here, reception power may be maximized by adjusting a feeding phase of each radiation element so that the electric field is added in the same phase at a position of a reception antenna.

In general, a distance between an array antenna and a reception antenna is assumed to be very far. Accordingly, power transmission efficiency between the antennas may be calculated by applying the Friis formula represented by Equation 1, after assuming that a distance between each of the antenna elements of the array antenna and the reception antenna is equal:

$$\eta = \frac{P_r}{P_t} = \frac{G_t G_r}{\left(\frac{4\pi R}{\lambda}\right)^2} \quad \text{[Equation 1]}$$

wherein $P_r$ denotes reception power, $P_t$ denotes transmission power, R denotes a distance between the transmission antenna and the reception antenna, $G_t$ denotes a gain of the transmission antenna, and $G_r$ denotes a gain of the reception antenna.

However, the general Friis formula might not be applied to an environment for wireless power transmission because a distance between each of the antenna elements of the array antenna and the reception antenna is different in the environment.

Accordingly, the controller 240 or the microwave power transmitter 230 of FIG. 2 calculates power transmission efficiency in consideration of an environment for actual wireless power transmission.

The controller 240 or the microwave power transmitter 230 of FIG. 2 may receive information on reception power through communication with the power reception apparatus, and may calculate power transmission efficiency based on Equation 2 below.

That is, when input power magnitudes of transmission radiation elements are respectively $P_1, P_2, \ldots, P_N$, distances between the reception antenna and the radiation elements are respectively $R_1, R_2, \ldots, R_N$, the radiation elements have the same gain, i.e., $G_{t0}$, and an antenna gain is $G_r$, a power efficiency transmitted to the reception antenna may be represented by Equation 2:

$$\eta = \frac{P_{rec}}{P_{in}} = \frac{G_{t0} G_r}{\sum_{i=1}^{N} P_i} \left(\frac{\lambda_0}{4\pi}\right)^2 \left(\sum_{i=1}^{N} \frac{\sqrt{P_i}}{R_i}\right)^2 \quad \text{[Equation 2]}$$

wherein an average distance between a radiation element at a transmission end and a reception antenna may be defined by Equation 3. In addition, a power transmission efficiency calculation method according to an embodiment of the present disclosure may be represented by Equation 4:

$$R_{mean} = \frac{N}{\frac{1}{R_1} + \frac{1}{R_2} + \cdots \frac{1}{R_N}}, \left(R_{shortest} < R_{mean} < \frac{\sum_{i=1}^{N} R_i}{N}\right) \quad \text{[Equation 3]}$$

$$\eta = \frac{P_r}{P_t} = \frac{G_t G_r}{\left(\frac{4\pi R_{mean}}{\lambda}\right)^2} \quad \text{[Equation 4]}$$

FIG. 10 is a view illustrating another configuration example of the microwave power transmitter of FIG. 2.

The microwave power transmitter illustrated in FIG. 10 may control multi-beam formation using an array antenna (not shown).

A verifier 1010 verifies information on a radiation pattern of an array antenna through full-wave simulation. For example, for full-wave simulation, a High Frequency Structure Simulator (HFSS) may be used.

The verifier 1010 verifies a radiation pattern of each of single antennas constituting the array antenna. The radiation pattern may be a radiation pattern modified by interference between an arranged position of the array antenna and surrounding single antennas.

The verifier 1010 calculates an average value of radiation patterns of the single antennas constituting the verified array antenna to generate information on a radiation pattern of the array antenna.

The verifier 1010 may only verify a radiation pattern of at least one of the single antennas constituting the array antenna.

Information on a radiation pattern of the array antenna may be a radiation pattern value of any one single antenna constituting the array antenna, an average value of at least two antennas of the single antennas constituting the array antenna, or an average value of a total of the single antennas constituting the array antenna.

The verifier 1010 may verify information on radiation characteristics of the array antenna before verifying information on a radiation pattern of the array antenna.

The information on the radiation characteristics may include information on the number of main beams, a beam width, a null section, a steering angle, a steering range, an interval between single antennas, etc.

For example, when a user requires formation of three main beams, information on the three main beam formation may be included.

The verifier 1010 may receive input of information on the radiation characteristics from a user through an input device connected to the multi-beam formation control device according to an embodiment of the present disclosure.

The verifier 1010 may verify radiation patterns of the single antennas through full-wave simulation based on information on the radiation characteristics of the array antenna.

A determiner 1020 determines an Array Factor (AF) based on information on the radiation pattern (AEP).

The AF may be determined to have an optimal gain and steering performance.

The AF is the reciprocal of the information on the radiation pattern (AEP).

The AF may be expressed by Equation 5 below when the array antenna is constituted of N single antennas:

$$AF(\psi) = \sum_{n=1}^{N} \frac{A_n e^{-j(n-1)\psi}}{AEP(\theta)}, (\psi = \beta d \sin\theta) \qquad \text{[Equation 5]}$$

wherein $A_n$ denotes the amplitude of an $n^{th}$ single antenna, AEP denotes information on a radiation pattern, θ. denotes a steering angle, d denotes an interval between single antennas, β denotes a propagation constant, and ψ denotes a phase difference between adjacent single antennas.

A power calculator 1030 may calculate the amplitude and phase of each of the single antennas constituting the array antenna based on an AF.

The amplitude ($A_n$) and the phase ($\o_n$) of each of the single antennas constituting the array antenna may be calculated according to Equation 6 below:

$$A_n e^{j\o n} = \frac{1}{2\pi} \int_{-\pi}^{\pi} AF(\psi) e^{-jn\psi} d\psi, (\psi = \beta d \sin\theta) \qquad \text{[Equation 6]}$$

wherein AF denotes an array factor, AEP denotes information on a radiation pattern, θ denotes a steering angle, n denotes the index of a single antenna, d denotes an interval between single antennas, β denotes a propagation constant, $A_n$ denotes the amplitude of an $n^{th}$ single antenna, $\o_n$ denotes the phase of an $n^{th}$ single antenna, and ψ denotes a phase difference between adjacent single antennas.

The controller 1040 respectively controls the single antennas based on the calculated respective amplitudes ($A_n$) and phases ($\o_n$).

The controller 1040 respectively controls the single antennas such that the calculated amplitudes ($A_n$) and phases ($\o_n$) are respectively input.

Accordingly, the multi-beam formation control device according to an embodiment of the present disclosure may minimize an error and more precisely form various beam shapes by calculating and controlling the amplitude and the phase of each of the single antennas using an AF in which an AEP is considered.

In addition, a gain may be improved upon steering and multi-beam formation that directly influence power transmission efficiency in wireless microwave power transmission.

This indicates that not only power transmission efficiency in wireless microwave power transmission may be improved but also a simultaneous charging and avoidance technique of multiple equipment may be improved.

FIG. 11 is a view illustrating a beam formation manner of the microwave power transmitter illustrated in FIG. 10.

(a) of FIG. 11 illustrates a beam formation manner according to a conventional technology, and (b) of FIG. 11 illustrates a beam formation manner according to an embodiment of the present disclosure.

Referring to FIG. 11, a radiation pattern of an array antenna is obtained by multiplying information on a radiation pattern (AEP) by an array factor (AF).

Here, the radiation pattern refers to a radiation pattern of the entire array antenna wherein respective radiation patterns of the single antennas are combined.

In a conventional technology, a radiation pattern 1113 is calculated by multiplying an AEP 1111 by an AF 1112. In this case, since a radiation pattern modified by interference between an arranged position of the array antenna and surrounding single antennas is not considered, a gain may be reduced and an error in a beam steering angle may occur.

However, in a method according to an embodiment of the present disclosure, a radiation pattern 1123 is calculated by multiplying an AF 1122, which has been obtained by multiplying AF by the reciprocal of an AEP, by an AEP 1121.

In this case, it can be confirmed that values are the same in two steering angles ($\psi_1$, $\psi_2$) and multiple beams may be formed.

As such, multiple beams having an improved gain may be formed at a desired steering angle.

Hereinafter, another embodiment of the microwave power transmitter 230 of FIG. 2 is described with reference to FIGS. 12A to 15D.

FIG. 12A is a view illustrating a microstrip patch antenna according to an embodiment of the present disclosure, and FIG. 12B is a view illustrating a protrusion provided on a microstrip patch antenna according to an embodiment of the present disclosure.

Referring to FIGS. 12A and 12B, the microwave power transmitter 230 of FIG. 2 may include at least one microstrip patch antenna 1200.

In accordance with an aspect, the microstrip patch antenna 1200 may be applied to at least one of a wireless power transmission antenna and a wireless power reception antenna.

That is, the microstrip patch antenna 1200 according to an embodiment of the present disclosure may be applied to a wireless power reception apparatus as well as a wireless power transmission apparatus.

In particular, the transmission efficiency of a wireless power transmission system may be determined according to gains of a wireless power transmission antenna and wireless power reception antenna.

That is, it is necessary to improve an antenna gain so as to increase transmission efficiency. In addition, in the case of a radar system using an array antenna, a dipole, a microstrip patch, etc. are used as a radiation element of each antenna included in the array.

Since the present disclosure uses the microstrip patch antenna 1200 to which conical protrusions are applied, antenna gain and transmission efficiency can be improved.

To accomplish this, the microstrip patch antenna 1200 according to an embodiment of the present disclosure may include a substrate 1210, a patch 1220, and a plurality of protrusions 1230.

The patch 1220 according to an embodiment of the present disclosure may be located on the substrate 1210.

The protrusions 1230 according to an embodiment of the present disclosure may be located on the patch 1220 and formed in a conical shape.

In accordance with an aspect, an inside of the protrusions 1230 may be filled with a conductor or a dielectric or evacuated into a vacuum state.

For example, an outside of the protrusions 1230 may be formed of a conductor.

In particular, an inside of each of the protrusions 1230 may be filled with a conductor, such as copper, or a nonconductor or evacuated into a vacuum state. In addition, antenna characteristics, such as antenna gain and frequency characteristics, may depend upon a material type filling each of the protrusions 1230.

In addition, antenna characteristics, such as antenna gain and frequency characteristics, may also depend upon a radius 1231 and a height 1232 of each of the protrusions 1230 and the number of the protrusions 1230.

FIG. 13A is a view illustrating reception power when a conventional microstrip patch antenna is applied, and FIG. 13B is a view illustrating reception power when a microstrip patch antenna according to an embodiment of the present disclosure is applied.

Referring to FIGS. 13A and 13B, reference 1310 illustrates results of transmission/reception power simulation performed at a distance of about 1 m using two conventional microstrip patch antennas to which protrusions were not applied.

Reference 1320 illustrates results of transmission/reception power simulation when a microstrip patch antenna according to an embodiment of the present disclosure including nine protrusions, a radius and a height of each of which are respectively 2 mm and 2.5 mm, was used as a wireless power reception antenna.

Referring to the simulation results of reference 1310, a measured reflection loss of each microstrip patch antenna was about −12.95 dB, and a measured insertion loss, which denotes a voltage transmitted to an antenna at a distance of 1 m, of the microstrip patch antenna was about −28.96 dB.

That is, referring to reference 1310, it was confirmed that about 0.13% of an input power was transmitted in a wireless power transmission system including two conventional microstrip patch antennas.

Next, it can be confirmed that, from the simulation results of reference 1320, a reception power increases by about 2 dB and a maximum power shifts to a frequency slightly lower than that of a received frequency band, compared to the case of reference 1310 wherein two conventional microstrip patch antennas are used, when a conventional microstrip patch antenna is used as a wireless power transmission antenna and a microstrip patch antenna according to an embodiment of the present disclosure is used as a reception antenna.

That is, it was confirmed that, referring to reference 1320, about 0.18% of an input power was transmitted in a wireless power transmission system in which a microstrip patch antenna according to an embodiment of the present disclosure was used as a wireless power reception antenna.

Accordingly, the microstrip patch antenna according to an embodiment of the present disclosure may increase wireless power transmission efficiency.

FIG. 13C is a view illustrating a radiation pattern of a conventional microstrip patch antenna, and FIG. 13D is a view illustrating a radiation pattern of a microstrip patch antenna according to an embodiment of the present disclosure.

Referring to FIGS. 13C to 13D, reference 1330 illustrates radiation pattern measurement results of a conventional microstrip patch antenna, and reference 1340 illustrates shows radiation pattern measurement results of a microstrip patch antenna according to an embodiment of the present disclosure.

Referring to reference 1330, antenna gain in a forward direction was about 1.59 dB when the general conventional microstrip patch antenna was used. On the other hand, referring to reference 1340, antenna gain in a forward direction was about 1.72 dB when the microstrip patch antenna according to an embodiment of the present disclosure was used.

Accordingly, the microstrip patch antenna according to an embodiment of the present disclosure can improve antenna gain, compared to the conventional microstrip patch antenna.

FIGS. 14A and 14B illustrate antenna characteristic changes dependent upon changes in a radius and height of each protrusion of a microstrip patch antenna according to an embodiment of the present disclosure.

Referring to FIGS. 14A and 14B, reference 1410 illustrates characteristic changes of a microstrip patch antenna according to an embodiment of the present disclosure including nine protrusions, a radius and height of each of which were respectively changed in increments of 0.5 mm, and reference 1420 illustrates characteristic changes of a microstrip patch antenna according to an embodiment of the present disclosure including 16 protrusions, a radius and height of each of which were respectively changed in increments of 0.5 mm.

Referring to references 1410 and 1420, it was confirmed that transmission/reception power increase in the microstrip patch antenna depended upon the number of the protrusions included therein. In addition, it was confirmed that the number, radius, and height of the protrusions capable of receiving the largest amount of power were different depending upon a frequency, and power that can be received did not necessarily increase every time the number, radius, and height of the protrusions was increased.

In particular, referring to reference 1420, a reception power of the antenna was maximum when an insertion loss was about −26.48 dB. In this case, about 0.18% of an input power was transmitted. This value is higher than the simulation result of 0.13% in reference 1310 of FIG. 13A.

In accordance with an aspect, in the microstrip patch antenna according to an embodiment of the present disclosure, at least one of the number of a plurality of protrusions and a radius and height of each of the protrusions may be set to a value capable of maximizing reception power of the antenna.

In particular, the number, radius, and height of the protrusions included in the microstrip patch antenna according to an embodiment of the present disclosure may be determined from experimental results shown in FIGS. 15A to 15D.

FIGS. 15A to 15D illustrate maximum reception power ratio changes dependent upon changes in a radius and height of each protrusion included in a microstrip patch antenna according to an embodiment of the present disclosure.

The following FIGS. 15A to 15D illustrate examples of the number of protrusions in the microstrip patch antenna according to an embodiment of the present disclosure and a radius and height of each of the protrusions so as to maximize reception power of the microstrip patch antenna. The number, radius, and height of protrusions capable of maximizing reception power may be changed depending upon a frequency or other factors.

Accordingly, the number of protrusions of the microstrip patch antenna according to an embodiment of the present disclosure and a radius and height of each of the protrusions are not limited to experimental results shown in FIGS. 15A to 15D.

Referring to FIGS. 15A to 15D, reference 1510 illustrates a maximum reception power ratio (S21) when four protrusions are included, reference 1520 illustrates the maximum reception power ratio (S21) when nine protrusions are included, reference 1530 illustrates the maximum reception power ratio (S21) when 16 protrusions are included, and reference 1540 illustrates the maximum reception power ratio (S21) when 25 protrusions are included.

In accordance with an aspect, when it is determined that the microstrip patch antenna according to an embodiment of the present disclosure includes four protrusions and a height of each of the protrusions is 1.5 mm to 3 mm, a radius of each of the protrusions may be set to 0.5 mm to 1.5 mm.

In particular, referring to reference 1510, when a height of each of the protrusions was set to 1.5 mm to 3 mm, the reception power ratio (S21) was maximum when a radius of each of the protrusions was 0.5 mm, and the reception power ratio (S21) was high also when a radius of each of the protrusions was 1.5 mm or 1 mm.

In other words, when it is determined that the microstrip patch antenna according to an embodiment of the present disclosure includes four protrusions and a height of each of the protrusions is 1.5 mm to 3 mm, a radius of each of the protrusions may be set to 0.5 mm.

In accordance with an aspect, when it is determined that the microstrip patch antenna according to an embodiment of the present disclosure includes nine protrusions and a height of each of the protrusions is 2 mm to 3 mm, a radius of each of the protrusions may be set to 0.5 mm to 2 mm.

In particular, referring to reference 1520, when a height of each of the protrusions was set to 2 mm to 3 mm, the reception power ratio (S21) was maximum when a radius of each of the protrusions was 2 mm, and the reception power ratio (S21) was high also when a radius of each of the protrusions was 0.5 mm.

In other words, when it is determined that the microstrip patch antenna according to an embodiment of the present disclosure includes nine protrusions and a height of each of the protrusions is 2 mm to 3 mm, a radius of each of the protrusions may be set to 2 mm.

In accordance with an aspect, when it is determined that the microstrip patch antenna according to an embodiment of the present disclosure includes 16 protrusions and a height of each of the protrusions is 2 mm to 2.5 mm, a radius of each of the protrusions may be set to 1.5 mm to 2.5 mm.

In accordance with an aspect, when it is determined that the microstrip patch antenna according to an embodiment of the present disclosure includes 16 protrusions and a height of each of the protrusions is 1.5 mm to 2 mm, a radius of each of the protrusions may be set to 2.5 mm.

In particular, referring to reference 1530, when a height of each of the protrusions was set to 2 mm to 2.2 mm, the reception power ratio (S21) was maximum when a radius of each of the protrusions was 2.5 mm. In addition, when a height of each of the protrusions was set to 2.2 mm to 2.5 mm, the reception power ratio (S21) was maximum when radius of each of the protrusions was 1.5 mm.

In addition, referring to reference 1530, when a height of each of the protrusions was set to 1.5 mm to 2 mm, the reception power ratio (S21) was maximum when a radius of each of the protrusions was 2.5 mm.

In other words, when it is determined that the microstrip patch antenna according to an embodiment of the present disclosure includes 16 protrusions and a height of each of the protrusions is 1.5 mm to 2.2 mm, a radius of each of the protrusions may be set to 2.5 mm.

In addition, when it is determined that the microstrip patch antenna according to an embodiment of the present disclosure includes 16 protrusions and a height of each of the protrusions is 2.2 mm to 2.5 mm, a radius of each of the protrusions may be set to 1.5 mm.

In accordance with an aspect, when it is determined that the microstrip patch antenna according to an embodiment of the present disclosure includes 25 protrusions and a height of each of the protrusions is 1.5 mm to 2 mm, a radius of each of the protrusions may be set to 2.5 mm.

In particular, referring to reference 1540, when a height of each of the protrusions was set to 1.5 mm to 2 mm, the reception power ratio (S21) was maximum when a radius of each of the protrusions was 2.5 mm.

In other words, when it is determined that the microstrip patch antenna according to an embodiment of the present disclosure includes 25 protrusions and a height of each of the protrusions is 1.5 mm to 2 mm, a radius of each of the protrusions may be set to 2.5 mm.

Therefore, when the number of a plurality of protrusions included in the microstrip patch antenna according to an embodiment of the present disclosure and a radius and height of each of the protrusions are determined such that reception power is maximized, antenna gain and transmission efficiency can be improved.

In accordance with the present disclosure, a wireless power transmission system that is highly efficient in three-dimensional selective spaces of visible range and nonvisible distance environments can be provided.

In accordance with the present disclosure, antenna gain and transmission efficiency can be improved by applying conical protrusions to a patch antenna.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

| 1200: Microstrip patch antenna | 1210: Substrate |
|---|---|
| 1220: Patch | 1230: Plurality of protrusions |

What is claimed is:

1. A wireless power transmission device comprising:
a wireless charging pad part;
a near-field power transmitter;
a microwave power transmitter including a microstrip patch antenna; and
a controller configured to control the wireless charging pad part, the near-field power transmitter and the microwave power transmitter,
wherein the wireless charging pad part includes a plurality of power transmission coils,
wherein the wireless charging pad part is configured to:
verify power transmission coils to be driven matching a device to be charged among the plurality of power transmission coils,
verify surrounding power transmission coils surrounding the power transmission coils to be driven among the plurality of power transmission coils, and
apply a first driving voltage having a first phase to the power transmission coils to be driven and apply a second driving voltage having a second phase different from the first phase to the surrounding power transmission coils,
wherein the microstrip patch antenna comprises:
a substrate;
a patch disposed on the substrate; and
a plurality of protrusions with a conical shape disposed on the patch,
wherein at least one of a number of the plurality of protrusions and a radius and height of each protrusion of the plurality of protrusions is determined such that reception power is maximized.

2. The wireless power transmission device according to claim 1, wherein the microstrip patch antenna is applied to at least one of a wireless power transmission antenna and a wireless power reception antenna.

3. The wireless power transmission device according to claim 1, wherein an inside of each protrusion of the plurality of protrusions is filled with a conductor.

4. The wireless power transmission device according to claim 1, wherein an inside of each protrusion of the plurality of protrusions is evacuated into a vacuum state.

5. The wireless power transmission device according to claim 1, wherein, when it is determined that the number of the plurality of protrusions is 4 and a height of each protrusion of the plurality of protrusions is 1.5 mm to 3 mm, a radius of each protrusion of the plurality of protrusions is set to 0.5 mm to 1.5 mm.

6. The wireless power transmission device according to claim 1, wherein, when it is determined that the number of the plurality of protrusions is 9 and a height of each protrusion of the protrusions is 2 mm to 3 mm, a radius of each protrusion of the plurality of protrusions is set to 0.5 mm to 2 mm.

7. The microstrip patch antenna wireless power transmission device according to claim 1, wherein, when it is determined that the number of the plurality of protrusions is 16 and a height of each protrusion of the plurality of protrusions is 2 mm to 3 mm, a radius of each protrusion of the plurality of protrusions is set to 1.5 mm to 2 mm.

8. The microstrip patch antenna wireless power transmission device according to claim 1, wherein, when it is determined that the number of the plurality of protrusions is 16 and a height of each protrusion of the plurality of protrusions is 1.5 mm to 2 mm, a radius of each protrusion of the plurality of protrusions is set to 2.5 mm.

9. The microstrip patch antenna wireless power transmission device according to claim 1, wherein, when it is determined that the number of the plurality of protrusions is 25 and a height of each protrusion of the plurality of protrusions is 1.5 mm to 2 mm, a radius of each protrusion of the plurality of protrusions is set to 2.5 mm.

\* \* \* \* \*